United States Patent
James et al.

(10) Patent No.: US 7,387,189 B2
(45) Date of Patent: Jun. 17, 2008

(54) EMERGENCY LUBRICATION SYSTEM

(75) Inventors: Denman H. James, Windsor, CT (US); J. Axel Glahn, Manchester, CT (US)

(73) Assignee: United Technologies Corp., Hartford, CT (US)

( * ) Notice: Subject to any disclaimer, the term of this patent is extended or adjusted under 35 U.S.C. 154(b) by 673 days.

(21) Appl. No.: 10/640,999

(22) Filed: Aug. 14, 2003

(65) Prior Publication Data

US 2005/0034924 A1 Feb. 17, 2005

(51) Int. Cl.
*F01D 25/18* (2006.01)
(52) U.S. Cl. .................................... 184/6.11
(58) Field of Classification Search ............. 184/6.1, 184/6.4, 6.11, 55.1; 60/39.08, 456; 222/504
See application file for complete search history.

(56) References Cited

U.S. PATENT DOCUMENTS

| | | | |
|---|---|---|---|
| 3,666,049 A | 5/1972 | Kern et al. ................. 26/104 |
| 3,779,345 A | 12/1973 | Barnes et al. ............. 184/6.4 |
| 3,785,461 A | 1/1974 | Rompa ..................... 184/55.2 |
| 4,002,224 A | 1/1977 | Easter | |
| 4,094,293 A | 6/1978 | Evans | |
| 4,105,093 A * | 8/1978 | Dickinson ................. 184/6.11 |
| 4,153,141 A | 5/1979 | Methlie ..................... 184/6.2 |
| 4,284,174 A | 8/1981 | Salvana ..................... 184/6.4 |
| 4,373,421 A | 2/1983 | Camboulives et al. ...... 184/6.4 |
| 4,390,082 A | 6/1983 | Swearingen ................ 184/6.4 |
| 4,446,377 A * | 5/1984 | Kure-Jensen et al. ........ 290/52 |
| 4,564,084 A * | 1/1986 | Heckel ..................... 184/6.11 |
| 4,717,000 A | 1/1988 | Waddington et al. ......... 184/61 |
| 4,856,273 A | 8/1989 | Murray ..................... 60/39.08 |
| 4,858,426 A | 8/1989 | Holcomb ................... 60/39.08 |
| 4,858,427 A | 8/1989 | Provenzano ............... 60/39.08 |
| 4,888,947 A | 12/1989 | Thompson ................ 60/39.08 |
| 4,917,218 A | 4/1990 | Murray ..................... 184/6.11 |
| 5,018,601 A | 5/1991 | Waddington et al. ........ 184/6.4 |

(Continued)

FOREIGN PATENT DOCUMENTS

EP   1 496 302 A   1/2005

*Primary Examiner*—Chong H Kim

(57) ABSTRACT

An emergency lubrication system for a turbine engine includes a reservoir 50 containing a reserve quantity of lubricant 52 and having a lubricant inlet 54 and a lubricant outlet 56. A lubricant supply line 62 and a lubricant outlet line 66 each have a respective valves 64, 68 for regulating lubricant flow into and out of the reservoir. A fluid supply line 70 includes a valve 72 for selectively establishing communication between the reserve quantity of lubricant and a source of pressurized fluid. During normal operation the lubricant outlet valve continuously releases lubricant at a normal rate to the component requiring lubrication while the lubricant inlet valve concurrently admits fresh lubricant into the reservoir. During abnormal operation, the lubricant inlet valve closes in response to abnormally low lubricant pressure outside the reservoir thereby preventing backflow of reserve lubricant out of the reservoir. The fluid inlet valve opens to admit pressurized fluid into the reservoir thus pressurizing the reserve lubricant. The lubricant outlet valve opens or cycles open and closed in response to a command from a controller 26 so that the pressurized fluid forces lubricant through the outlet 56 as a subnormal rate, which persists until the lubricant reserve is substantially depleted. The subnormal rate is ideally achieved by intermittently releasing lubricant from the reservoir, but may also be achieved by releasing a continuous stream of lubricant at a rate less than the normal rate of release.

16 Claims, 4 Drawing Sheets

U.S. PATENT DOCUMENTS

| | | | |
|---|---|---|---|
| 5,042,618 A * | 8/1991 | Switalski et al. | 184/6.26 |
| 5,046,306 A | 9/1991 | Borre, Jr. | 60/39.08 |
| 5,097,926 A | 3/1992 | Duello | 184/6.4 |
| 5,121,815 A | 6/1992 | Francois et al. | 184/6.4 |
| 5,423,399 A * | 6/1995 | Smith et al. | 184/5.1 |
| 5,513,722 A | 5/1996 | Foltz | 184/55.2 |
| 5,636,708 A | 6/1997 | Wedeven et al. | 184/6.22 |
| 5,996,739 A * | 12/1999 | Hoffmann | 184/7.4 |
| 6,161,649 A | 12/2000 | Cotler | 184/6.26 |
| 6,167,318 A | 12/2000 | Kizer et al. | 700/83 |
| 6,463,819 B1 | 10/2002 | Rago | 74/6.2 |
| 2003/0110778 A1 | 6/2003 | Karafillis et al. | 60/785 |
| 2005/0000753 A1 | 1/2005 | Sheridan | 184/55.1 |

* cited by examiner

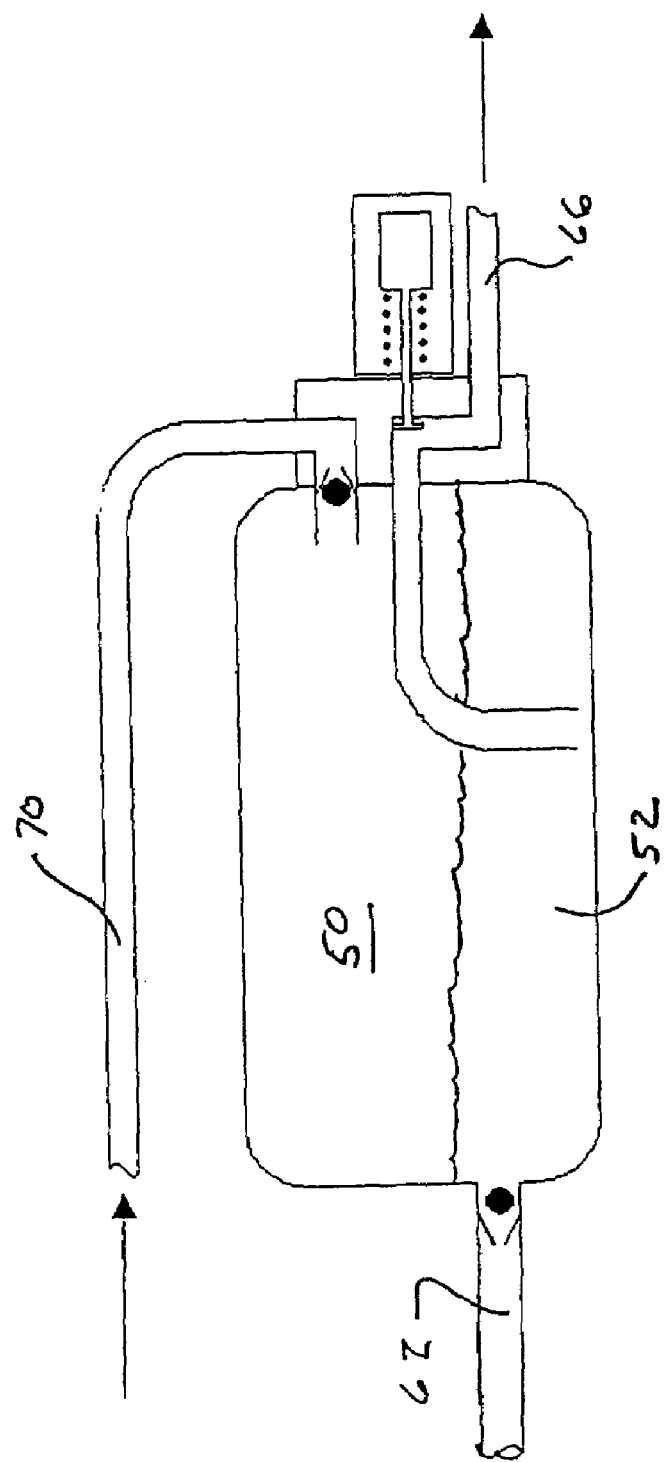

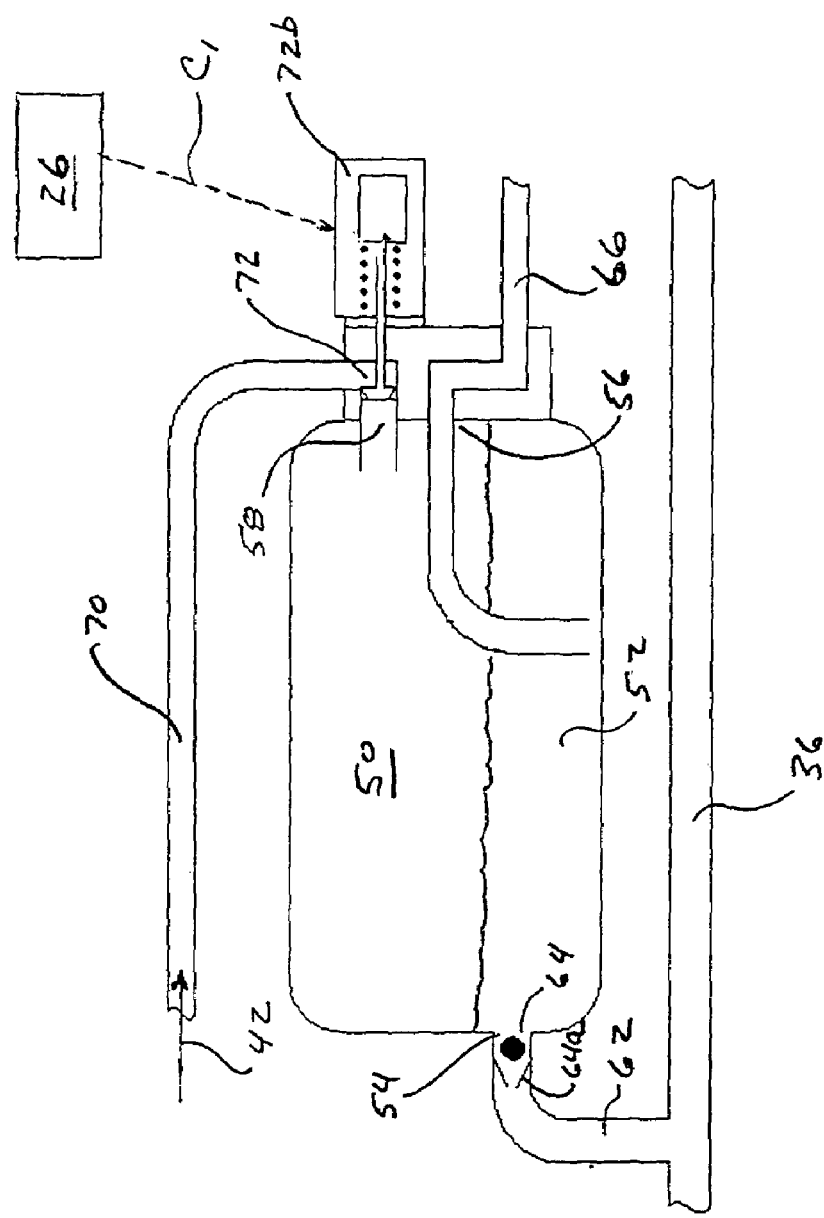

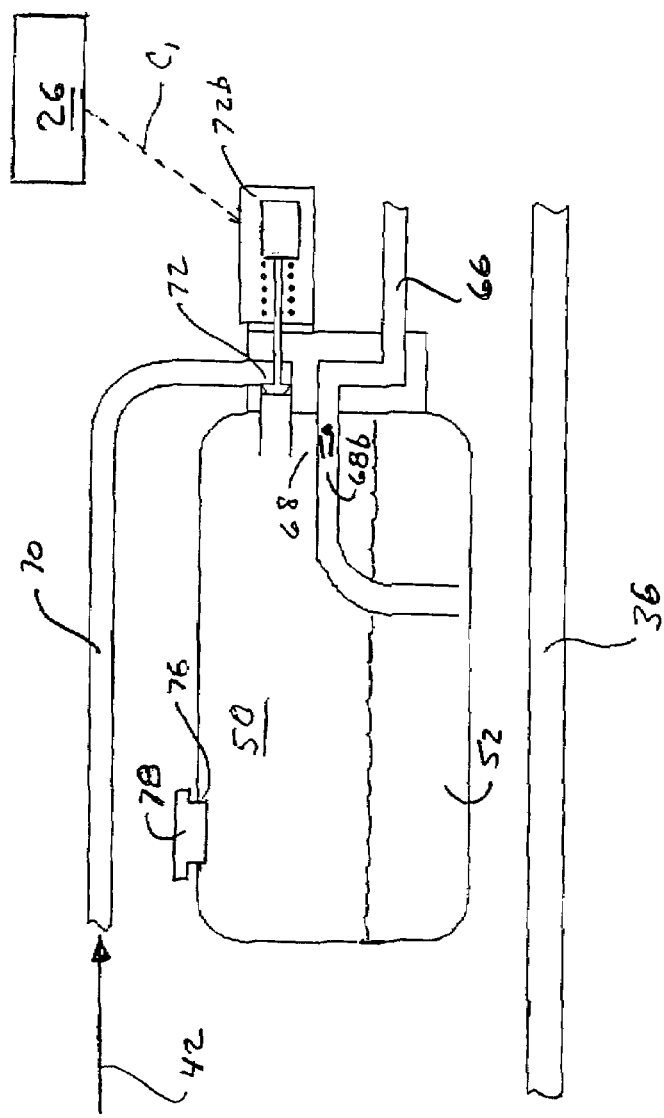

EMERGENCY LUBRICATION SYSTEM

STATEMENT OF GOVERNMENT INTEREST

This invention was made under a U.S. Government Contract. The Government has certain rights in the invention.

TECHNICAL FIELD

This invention relates to lubrication systems and particularly to a turbine engine lubrication system capable of supplying lubricant for a limited time following a failure or malfunction of a lubrication system component.

BACKGROUND OF THE INVENTION

Lubrication systems, such as those used in aircraft gas turbine engines, supply lubricant to bearings, gears and other engine components that require lubrication. The lubricant, typically oil, cools the components and protects them from wear. A typical oil lubrication system includes conventional components such as an oil tank, pump and filter.

If one of the lubrication system components fails, malfunctions or sustains damage, the oil supply to the lubricated component may be disrupted resulting in irreparable damage to the component and undesirable corollary consequences. For example, if an engine oil pump fails, the resulting loss of oil pressure could disable the engine by causing overheating and/or seizure of the bearings that support the engine shaft. An aircraft engine that becomes disabled in flight is obviously a concern, especially if the engine powers a single-engine military aircraft operating in hostile airspace.

It is known to accommodate the possibility of a failure in the oil system by configuring the system so that it continues to supply oil to the lubricated components for a limited time, thereby enabling continued temporary operation of the engine. Such a system allows the aircraft crew time to safely shut down the engine or to take other appropriate actions to safeguard the aircraft and its occupants. In a military aircraft, such a system can provide the crew with valuable additional time to return to friendly airspace.

An emergency lubrication system for an aircraft engine should possess several desirable attributes. The system should provide emergency lubrication for as long as possible, but should not add significantly to aircraft weight or consume precious space by requiring that the aircraft carry a large reserve of emergency lubricant. Moreover, it is desirable that any reserve quantity of lubricant be continuously replenished. Otherwise the properties of the reserve lubricant could degrade over time, rendering the lubricant unsuitable for use when called upon in an emergency. The emergency system should also make as much use as possible of the existing non-emergency lubrication system hardware and lubricant flowpaths, thus avoiding the weight, cost and complexity of dedicated emergency hardware. The system should also operate autonomously, i.e. without requiring that the aircraft crew take any action to engage the system.

Some known lubrication systems use high pressure to deliver a high velocity stream of lubricant during normal operation, but provide a low velocity mist or gravity induced flow of lubricant during abnormal or emergency conditions. Despite the merits of these systems, they may not be satisfactory for all applications. For example, intershaft bearings, such as those used between corotating or counter-rotating shafts of a turbine engine, normally receive lubricant by way of a lubricant flowpath that includes scoops projecting from the exterior of a shaft and lubricant passageways (which may include the shaft bore) extending axially through a shaft. The scoops receive pressurized lubricant from the lubricant pumps mounted on the nonrotating structure of the engine and convey that lubricant to the passageways, which then guide the lubricant to the intershaft bearings. Because the scoops and passageways are designed to receive and transport high velocity lubricant, they may not work satisfactorily with low velocity lubricant such as a lubricant mist or a gravity induced lubricant stream. Hence, if it is desired to use the existing lubricant flowpath under emergency operating conditions, it is advantageous to maintain lubricant pressure despite the failure of one or more of the lubrication system components. Although it might be possible to include auxiliary features and hardware that allow low pressure emergency lubricant (e.g. a mist or gravity induced stream) to bridge the interface between the nonrotating structure and the rotating shafts and adequately lubricate the bearing, doing so would introduce undesirable weight, cost and complexity.

SUMMARY OF THE INVENTION

It is, therefore, an object of the invention to provide an emergency lubrication system for a gas turbine engine that allows continued operation of the engine for as long as possible following failure of a system component and accompanying loss of oil pressure. Further objects are that the system be light weight and compact and that it operate autonomously.

According to the invention, a lubrication system for a turbine engine includes a reservoir containing a reserve quantity of lubricant and having a lubricant inlet and a lubricant outlet. During a normal mode of operation, the reservoir receives lubricant through the inlet while concurrently releasing lubricant from the outlet at a normal rate. The system also includes a means for resisting backflow of reserve lubricant through the inlet and for effecting a subnormal rate of lubricant release during abnormal operation, such as when the lubricant pressure becomes abnormally low. The subnormal rate of release persists until the lubricant reserve is substantially depleted. The subnormal rate is ideally achieved by intermittently releasing lubricant from the reservoir, but may also be achieved be releasing a continuous stream of lubricant at a rate less than the normal rate of release.

In one detailed embodiment of the invention, a lubricant supply line and a lubricant outlet line have a lubricant inlet valve and a lubricant outlet valve, respectively, for regulating lubricant flow into and out of the reservoir. A fluid supply line employs a fluid inlet valve to selectively establish communication between the reserve quantity of lubricant and a source of pressurized motive fluid. During normal operation, the fluid inlet valve isolates the reservoir from the pressurized fluid while the lubricant outlet valve continuously releases lubricant to the component requiring lubrication and the lubricant inlet valve concurrently admits fresh lubricant into the reservoir. During abnormal operation, the lubricant inlet valve closes in response to abnormally low lubricant pressure outside the reservoir thereby resisting backflow of reserve lubricant out of the reservoir. The fluid inlet valve opens to admit pressurized fluid into the reservoir thus pressurizing the reserve lubricant. The lubricant outlet valve cycles open and closed to intermittently release lubricant under the influence of the pressure applied by the pressurized fluid.

One advantage of the invention is that it affords the aircraft crew an interval of time to shut down the affected engine and/or take other actions necessary to safeguard the aircraft and its occupants. The subnormal rate of lubricant release conserves lubricant, thus prolonging the time interval. Another advantage is that the emergency system takes advantage of existing non-emergency components, rather than requiring additional auxiliary components. This ensures that the system is simple, reliable, compact, light weight and inexpensive.

BRIEF DESCRIPTION OF THE DRAWINGS

FIG. 2 is a schematic illustration showing an emergency lubrication system similar to that of FIG. 1, but arranged in series with a main lubrication flowpath.

FIG. 3 is a schematic illustration showing an emergency lubrication system similar to that of FIG. 1, but with an alternate valving arrangement.

FIG. 4 is a schematic illustration showing another alternate embodiment of the inventive lubrication system.

BEST MODE FOR CARRYING OUT THE INVENTION

Figure 1:
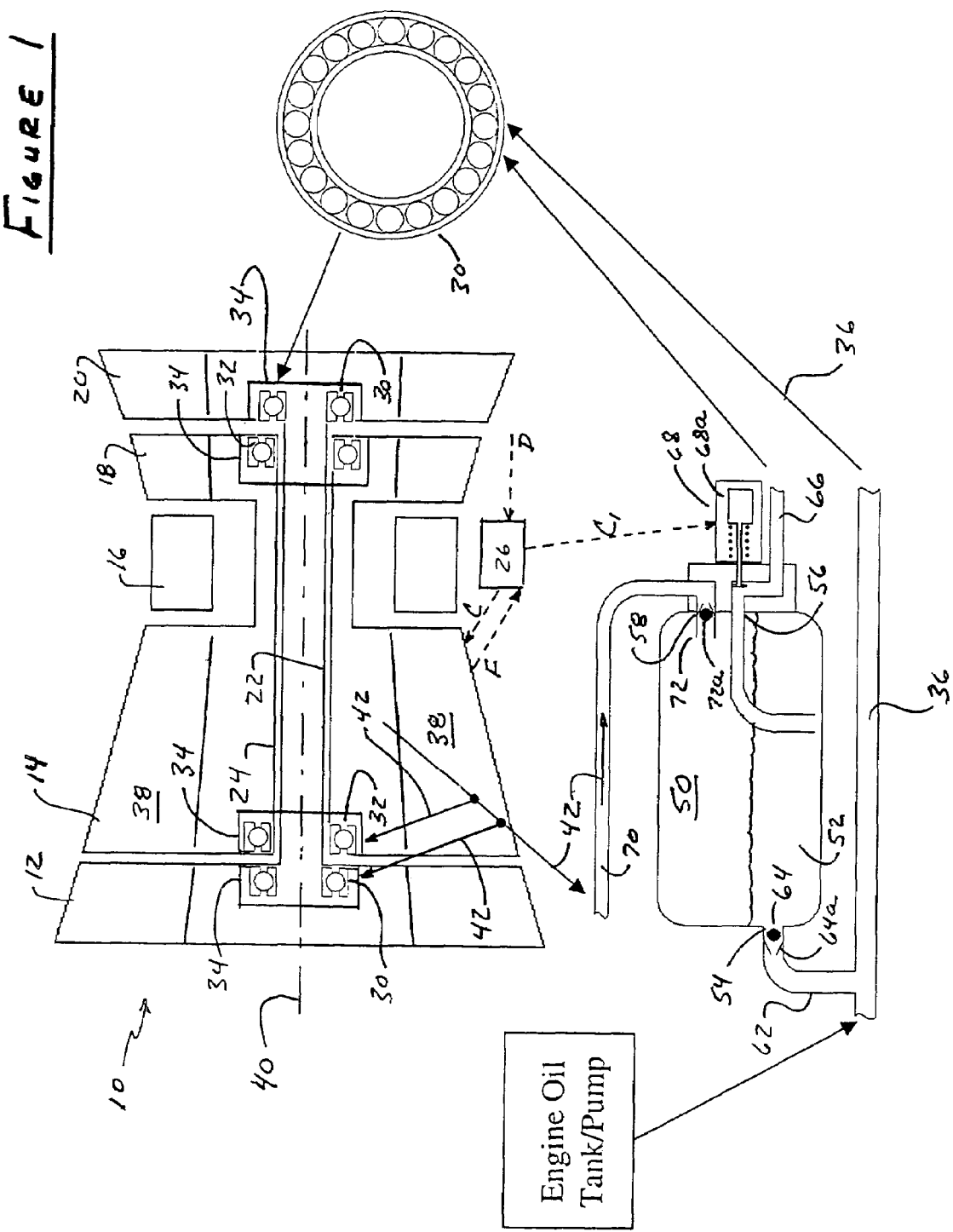
FIG. 1 is a schematic illustration of a turbine engine showing an exemplary embodiment of the emergency lubrication system of the present invention.

Referring to FIG. 1, an aircraft gas turbine engine 10 includes low pressure and high pressure compressors 12, 14, a combustor 16, and high pressure and low pressure turbines 18, 20. A low speed shaft 22 couples the low pressure compressor to the low pressure turbine. A high speed shaft 24 couples the high pressure compressor to the high pressure turbine. An engine controller 26 issues control signals C to various engine valves and actuators in response to demand signals D from the aircraft pilot and feedback signals F from the engine.

Bearings 30 support the low speed shaft from the nonrotatable engine structure. Intershaft bearings 32 support the high speed shaft from the low speed shaft. The bearings are enclosed in bearing compartments 34. A lubrication system, which typically includes an oil tank, pump, filters and deaerators, supplies a lubricant to the bearing compartments, and thus to the bearings, by way of a main lubricant flowpath, which is schematically represented in the illustration as a conduit 36. The lubricant cools and lubricates the bearings.

An annular, working medium fluid flowpath 38 circumscribes an axially extending centerline 40 and extends axially through the engine. During operation, the compressors pressurize a working medium fluid, specifically ambient air. The pressurized air supports combustion of a fuel in the combustor. The resulting products of combustion flow through the turbines, which power the compressors by way of shafts 22, 24.

Although most of the air flowing through the compressors enters the combustor, a portion of the air may be extracted from the compressors for other uses. For example, it is customary to divert a quantity of pressurized air 42 to the vicinity just outside the bearing compartments 34. The diverted air is at a pressure slightly higher than the prevailing pressure inside the bearing compartments and therefore helps to resist lubricant leakage out of the compartments. This diverted air 42 is referred to as buffer air.

A lubricant reservoir 50 is mounted on the nonrotating structure of the engine. The reservoir holds a reserve quantity of lubricant 52. The reservoir has a lubricant inlet 54, a lubricant outlet 56 and a fluid inlet 58. A lubricant supply line 62, which branches off the main lubricant flowpath 36, extends to the lubricant inlet 54. A lubricant inlet valve 64, represented by check valve 64a, regulates lubricant flow through the lubricant inlet 54. The check valve operates passively in response to local lubricant pressure, i.e. its position is directly governed by local influences acting on the valve, specifically the difference in lubricant pressure on either side of the valve.

A lubricant outlet line 66 extends from the lubricant outlet 56 to convey lubricant to the bearings. A lubricant outlet valve 68, represented by electrically powered solenoid operated valve 68a, regulates lubricant flow through the lubricant outlet 56. The solenoid valve is a nonpassive valve, i.e. its position is governed by the solenoid acting in response to control signal $C_1$, not by local influences acting directly on the valve. Although the solenoid valve is a two position valve, variants of the invention may benefit from or even require a modulating valve. Moreover, other types of valves, such as mechanically, hydraulically or pneumatically driven valves may also be used.

A fluid supply line 70 extends from the fluid inlet 58 to a source of pressurized fluid. A fluid inlet valve 72, represented by check valve 72a, selectively establishes communication between the reserve quantity of lubricant 52 and a source of pressurized fluid. In the illustrated example, the pressurized fluid is a portion of the bearing compartment buffer air 42.

During a normal mode of engine operation, a main lubrication circuit provides high pressure lubricant to the bearing compartments. The pressure of the lubricant in the main circuit opens lubricant inlet check valve 64a so that a fraction of the main lubricant supply also enters the reservoir 50 to establish a reserve quantity of pressurized lubricant 52 therein. The reserve quantity need be established only on a new or recently serviced engine because, as the reader will soon appreciate, the reserve quantity remains confined in the reservoir, although it is continuously extracted and replenished during normal engine operation. The check valve 64a remains open as long as the lubricant supply pressure exceeds the pressure in the reservoir.

During normal operation, the solenoid valve 68a is commanded to its open position by the controller. As a result, reserve lubricant is continuously released from the reservoir at a normal rate. Replenishment of the reserve lubricant occurs as a result of fresh lubricant admitted to the reservoir through inlet 54. Consequently, the reserve lubricant is not susceptible to age related degradation. The fluid inlet check valve 72a remains closed because the pressure in the reservoir exceeds that of the buffer air 42.

In the event that a malfunction or failure in the main lubricant circuit disrupts the lubricant supply to the bearing, the attendant reduction or complete loss of main lubricant pressure causes check valve 64a to close, thus resisting backflow of reserve lubricant through the lubricant inlet 54. To the extent that the solenoid valve 68a remains open, reserve lubricant continues to flow from the reservoir to the bearing. The continued release of lubricant begins depressurizing the reservoir so that fluid inlet check valve 72a opens, thereby establishing communication between the reserve lubricant 52 and the pressurized buffer air 42. The buffer air maintains pressure on the reserve lubricant to force it through the outlet line 66 to the bearing. As pointed out previously, maintaining pressure on the lubricant may be highly advisable if the lubricant must pass through a lubricant flowpath leading to an intershaft bearing or other lubricant flowpath not designed to accept low pressure lubricant. The pressurization of the lubricant by the buffer air causes a pressurized stream of lubricant to be released from the reservoir.

In order to conserve lubricant, a suitable sensor, such as a pressure sensor in the main lubricant circuit, detects the disruption of the lubricant supply and informs the controller 26. The controller then issues a command $C_1$ to lubricant outlet valve 68 to effect a subnormal rate of lubricant release through the lubricant outlet 56. The command $C_1$ may cause the valve 68 to cycle between its open and closed positions, in which case the subnormal release of lubricant is an intermittent release. The intermittent release is desirable because it is highly effective at conserving lubricant, and therefore provides for a long interval of emergency operation in the abnormal mode. Moreover, we have discovered that the intermittent application of lubricant, although not satisfactory for normal operation, is satisfactory for emergency operation. Alternatively, the command $C_1$ may cause the valve 68 to remain open or partially open, in which case the subnormal release of lubricant is a continuous release at a rate lower than the rate of release in the normal mode of operation. Either way, the subnormal release persists until the reserve quantity of lubricant 52 is substantially depleted.

Because the above described system enables the engine to continue operating after failure of a system component, pressurized air 42 continues to be available to pressurize the reserve lubricant and force lubricant to the bearing. As a result, the operation of the engine is sustained, albeit in an abnormal operating mode. The sustained operation of the engine ensures an uninterrupted supply of pressurized air to the reservoir so that the bearings continue to receive lubricant and the engine continues to operate in the abnormal mode. Because the lubricant flows from the reservoir at a subnormal rate, the bearing will likely experience highly accelerated wear and require replacement. Nevertheless, the subnormal quantity of lubricant is adequate to keep the engine operating safely until the lubricant reserve in the reservoir is depleted. The aircraft crew can take advantage of this additional interval of operation to systematically follow the procedures necessary to safeguard the aircraft and its occupants and to safely shut the engine down before the bearings sieze or overheat. If the engine powers a military aircraft operating in hostile airspace, the crew can use the interval of extended operation to proceed toward friendly airspace.

Although FIG. 1 depicts a parallel flow configuration, a series flow configuration, as depicted in FIG. 2, may also be employed. In the series flow configuration the supply line 62 to the reservoir and the lubricant outlet line 66 are the exclusive vehicle for supplying lubricant to the bearing. All lubricant destined for the bearing traverses through the reservoir during the normal mode of operation.

FIG. 3 illustrates an alternate embodiment of the invention in which the fluid inlet valve 72 is a nonpassive valve. In the illustrated example, the nonpassive valve is a solenoid valve 72b, but may be a modulating valve if necessary or desirable. No valve is present in the lubricant outlet line 66. During the normal mode of operation, the lubricant inlet check valve 64a is open as in the first embodiment. Solenoid valve 72b is closed. Lubricant enters the reservoir through inlet 54 and is released through outlet 56. During abnormal operation, abnormally low lubricant pressure causes check valve 64a to close. The controller 26 commands the solenoid valve 72b to cycle open and closed. When the valve 72b opens, the pressurized buffer air 42 acts on the reserve lubricant and forces some of the lubricant through the lubricant outlet 56. When the valve 72b closes, pressurized lubricant flow soon ceases. In the present example, the subnormal rate of lubricant release is an intermittent release. However a continuous subnormal rate of lubricant release may be achieved by keeping valve 72 in an open or partially open position.

In the above described embodiments, the lubricant inlet valve 64, fluid inlet valve 72 and the lubricant outlet valve 68 (when present) and the coordinated operation of these valves offer an effective way to resist backflow of reserve lubricant out of the reservoir and to effect a subnormal rate of lubricant release during the abnormal mode of operation.

FIG. 4 shows another alternate embodiment of the invention in which the reservoir 50 is a tank that holds a reserve ration of lubricant 52. The tank has an opening 76 sealed by a removeable cap 78. A maintenance technican introduces the reserve ration of oil into the tank through the opening prior to use of the engine. Means are provided for confining the lubricant ration in the tank during a normal mode of operation and for releasing lubricant from the tank at a regulated rate during the abnormal mode of operation. In the illustrated variant, a fluid inlet valve 72 in the form of a solenoid valve 72b or other nonpassive valve selectively establishes communication between the reserve ration of lubricant and the buffer air 42. A lubricant outlet valve 68 represented by check valve 68b regulates lubricant release through the outlet line 66. During normal operation both valves are closed, thus confining the lubricant ration in the tank. During abnormal operation, the valve 72b is commanded to open or to cycle open and closed, thus introducing pressurized buffer air 42 into the tank and forcing lubricant past the check valve 68b at a regulated rate. Another variation has a valve arrangement similar to that of FIG. 1. The fluid inlet valve 72 is passive, the lubricant outlet valve 68 is nonpassive and the tank holds an initially pre-pressurized ration of lubricant. During normal operation, both valves are closed. During abnormal operation, the nonpassive lubricant outlet valve opens or cycles open and closed in response to a controller command to effect a regulated release of lubricant under the influence of the initial pre-pressurization. The release of lubricant causes a decay of the pressure inside the tank, which allows the passive fluid inlet valve to open, thus admitting pressurized buffer air to maintain adequate pressurization. Other variants employ only a single, nonpassive valve, either a fluid inlet valve or a lubricant outlet valve.

The embodiment of FIG. 4 does not continually refresh the lubricant in the reservoir. Nevertheless, lubricant freshness can be ensured by periodic draining and refilling of the tank by maintenance personnel. In some applications, such as engines for single-use vehicles, periodic refreshment may not be required.

As is evident from the foregoing, the invention in its various embodiments supplies a primary quantity of lubricant to the bearing during the normal mode of operation. For the embodiments of FIGS. 1, 3 and 4, This primary quantity is the aggregate of the quantities flowing through main lubricant flowpath 36 and the normal amount of lubricant released through lubricant outlet 56. For the embodiment of FIG. 2, the primary quantity is the amount of lubricant released through the outlet 56 because all the lubricant passes through the reservoir 50. During the abnormal mode of operation, which occurs if the primary supply of lubricant is disrupted, the invention provides for the release of a secondary quantity of lubricant. This secondary quantity is the amount released from the reservoir or tank 50. The secondary quantity is a subnormal quantity, less than the normal quantity released during the normal mode of operation. The subnormal quantity may be the result of an intermittent release of lubricant, or may be the result of a continuous release of lubricant at a rate of flow less than the normal rate of flow through lubricant outlet 56. For the embodiment of FIG. 4, the secondary, subnormal quantity is a quantity less than that provided by the main lubrication circuit. This subnormal quantity would typically approximate the subnormal quantities provided by the embodiments of FIG. 1-3.

Although this invention has been shown and described with reference to detailed embodiments thereof, it will be understood by those skilled in the art that various changes in form and detail may be made without departing from the invention as set forth in the accompanying claims.

We claim:

1. In a gas turbine engine having a controller which receives feedback signals from said engine and issues control signals in response thereto, a lubrication system lubricating a component during both normal operating conditions of said engine wherein a normal flow of lubricant is supplied to said component by said lubrication system, and malfunctioning conditions of said engine wherein said normal flow of lubricant supplied to said component by said lubrication system is disrupted, said lubrication system comprising:
   a reservoir for holding a reserve quantity of lubricant, said reservoir having an inlet and an outlet;
   said inlet being closed during said malfunctioning condition to prevent backflow of lubricant from said reservoir through said inlet thereof;
   an air conduit providing fluid communication between a supply of pressurized air and the interior of said reservoir and
   a control valve responsive to signals provided by said engine controller to effect lubricant flow from the interior of said reservoir through said outlet to said component, said control valve being disposed in said air conduit and being closed for blocking flow of said pressurized air to the interior of said reservoir during normal engine operating conditions and opening to allow pressurization of said reservoir by said pressurized air during said malfunctioning conditions to establish an emergency flow of lubricant to said component.

2. The lubrication system of claim 1 wherein said inlet comprises a removable cap.

3. The lubrication system of claim 1 and further including a check valve in said reservoir outlet for maintaining said outlet closed during said normal engine operating conditions, whereby said component is lubricated entirely independently from said reservoir during said normal operating conditions.

4. The lubrication system of claim 1 wherein said inlet is provided with lubricant from a conduit providing pressurized lubricant for lubricating said component during normal engine operating conditions.

5. The lubrication system of claim 4 and further including a normally open check valve disposed in said inlet conduit, said check valve closing during said engine malfunctioning condition.

6. The lubrication system of claim 5 wherein said reservoir outlet remains in fluid communication with said component during both normal and malfunctioning engine operating conditions.

7. In a gas turbine engine having a controller which receives feedback signals from said engine and issues control signals in response thereto, or said lubrication system lubricating a component during both normal operating conditions of said engine wherein a normal flow of lubricant is supplied to said component by said lubrication system, and malfunctioning conditions of said engine wherein said normal flow of lubricant supplied to said component by said lubrication system is disrupted, said lubrication system comprising:
   a reservoir for holding a reserve quantity of lubricant, said reservoir having an inlet and an outlet;
   said inlet being closed during said malfunctioning condition to prevent backflow of lubricant from said reservoir through said inlet thereof;
   an air conduit providing fluid communication between a supply of pressurized air and the interior of said reservoir and
   a control valve responsive to signals provided by said engine controller to effect lubricant flow from the interior of said reservoir through said outlet to said component, said control valve being disposed in said reservoir outlet and being open for allowing a normal flow of lubricant from said reservoir during normal engine operating conditions as well as during said engine malfunctioning conditions.

8. The lubrication system of claim 7 wherein said Inlet is provided with lubricant from a conduit providing pressurized lubricant for lubricating said component during normal engine operating conditions.

9. The lubrication system of claim 8 and further including a normally open check valve disposed in said reservoir inlet, said check valve closing in response to said engine malfunctioning condition.

10. The lubrication system of claim 7 and further including a normally closed check valve in said air conduit, said normally closed check valve opening, to allow pressurization of said reservoir by said pressurized air during said engine malfunctioning condition.

11. The lubrication system of claim 7 wherein said component is provided with lubricant from said outlet as well as from said conduit during normal engine operating conditions.

12. The lubrication system of claim 7 wherein under normal engine operating conditions, said component is lubricated by lubricant flow sequentially from said reservoir inlet, through said reservoir and finally, through said reservoir outlet.

13. The lubrication system of claim 7 wherein said control valve opens to a first position to allow normal lubricant flow to said component during normal operating conditions and a second position allowing a less-than-normal lubricant flow through said outlet during said engine malfunctioning conditions.

14. The lubrication system of claim 8 wherein said control valve repeatedly opens and closes to provide an intermittent release of lubricant flow from said reservoir during said engine malfunction conditions.

15. The lubrication system of claim 1 wherein the pressurized air is buffer air supplied by the compressor of said gas turbine engine.

16. The lubrication system of claim 1 wherein said lubricated component comprises a bearing.

* * * * *